Aug. 20, 1963
P. DI LELLA
3,100,954
GRINDING MACHINE
Filed March 20, 1962
4 Sheets-Sheet 2
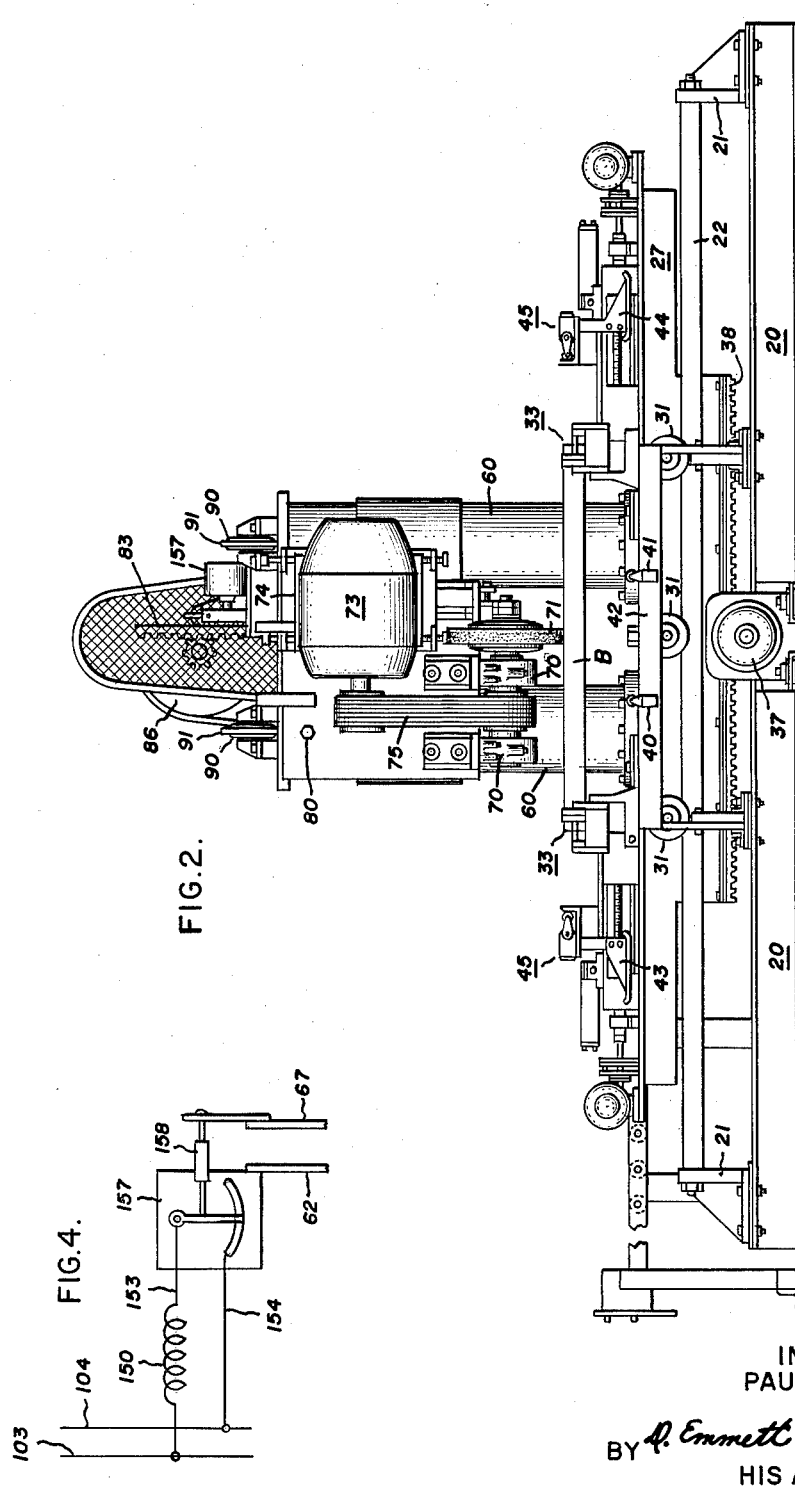
INVENTOR:
PAUL DiLELLA,
BY D. Emmett Thompson
HIS ATTORNEY.

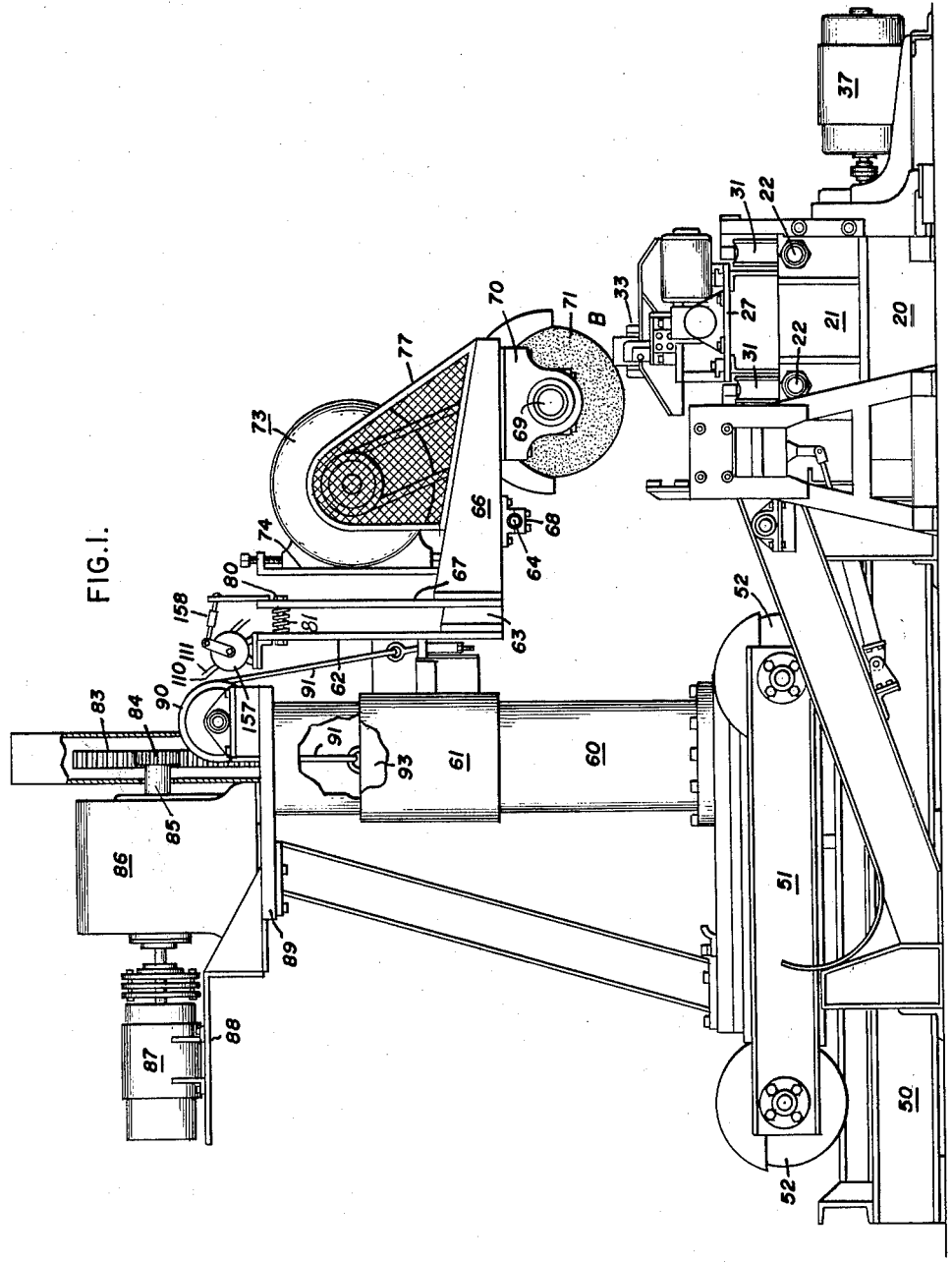

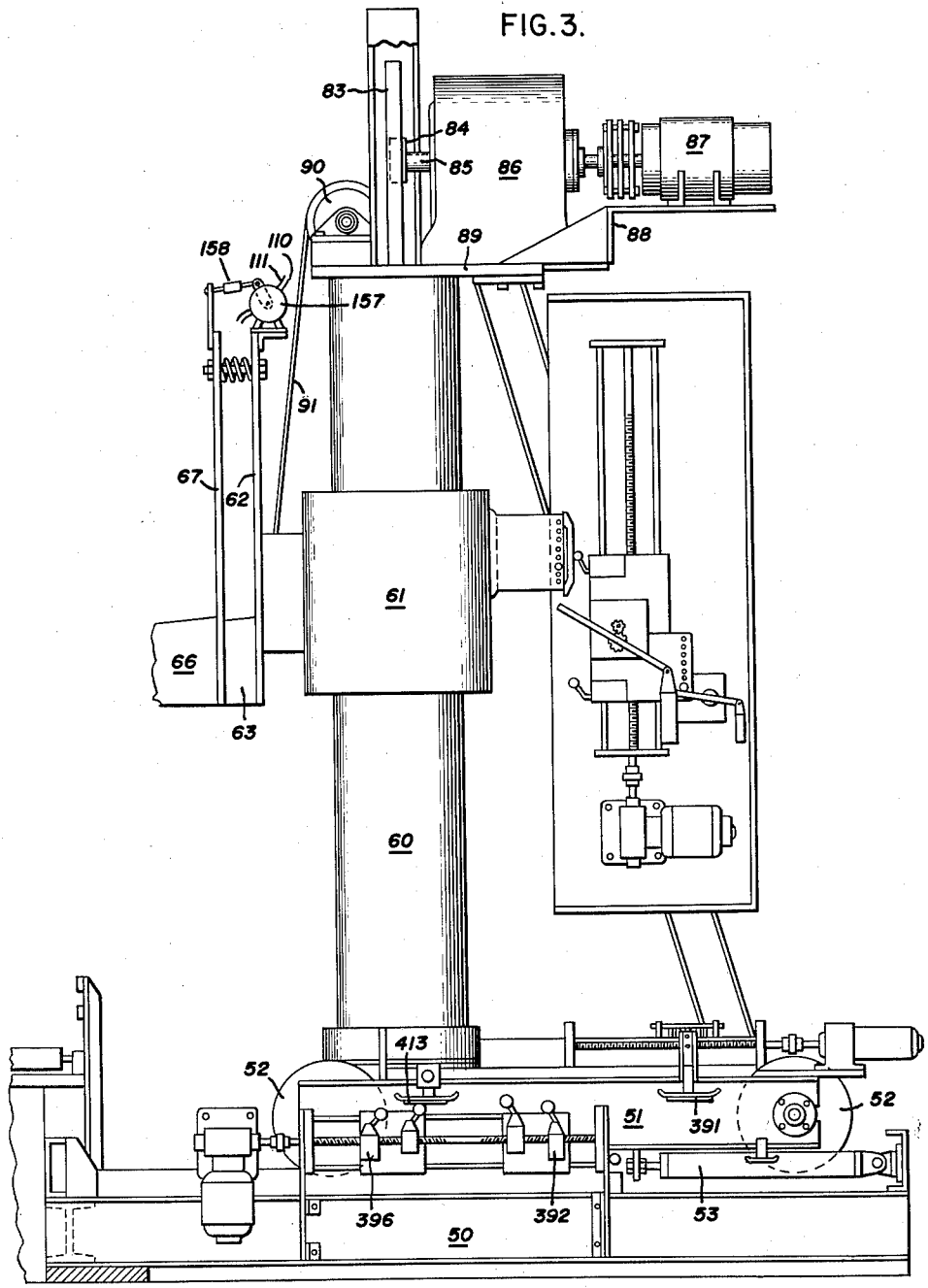

Aug. 20, 1963     P. DI LELLA     3,100,954
GRINDING MACHINE
Filed March 20, 1962     4 Sheets-Sheet 4

INVENTOR:
PAUL DiLELLA,
BY Q. Emmett Thompson
HIS ATTORNEY.

3,100,954
GRINDING MACHINE
Paul Di Lelia, 61 Hardwicke Drive, Solvay, N.Y.
Filed Mar. 20, 1962, Ser. No. 181,012
3 Claims. (Cl. 51—165)

This invention relates to grinding machines, and more particularly to grinding machines which function automatically to remove a uniform thickness of metal from work pieces of substantial dimension, such as steel billets and slabs. A machine of this type is disclosed in my copending application, Serial Number 97,562, filed March 22, 1961.

This invention has as an object a grinding machine embodying a pressure control system which functions to automatically maintain within exceedingly close limits a uniform pressure of predetermined value between the grinding wheel and the work piece.

The invention consists in the novel features and in the combinations and constructions hereinafter set forth and claimed.

In describing this invention reference is had to the accompanying drawings in which like characters designate corresponding parts in all the views.

FIGURE 1 is a side elevational view of a grinding machine embodying my invention.

FIGURE 2 is a front elevational view of the machine.

FIGURE 3 is a side elevational view showing the side of the machine opposite to that shown in FIGURE 1, and with parts omitted.

FIGURE 4 is a modified form of voltage regulator.

Figure 5:
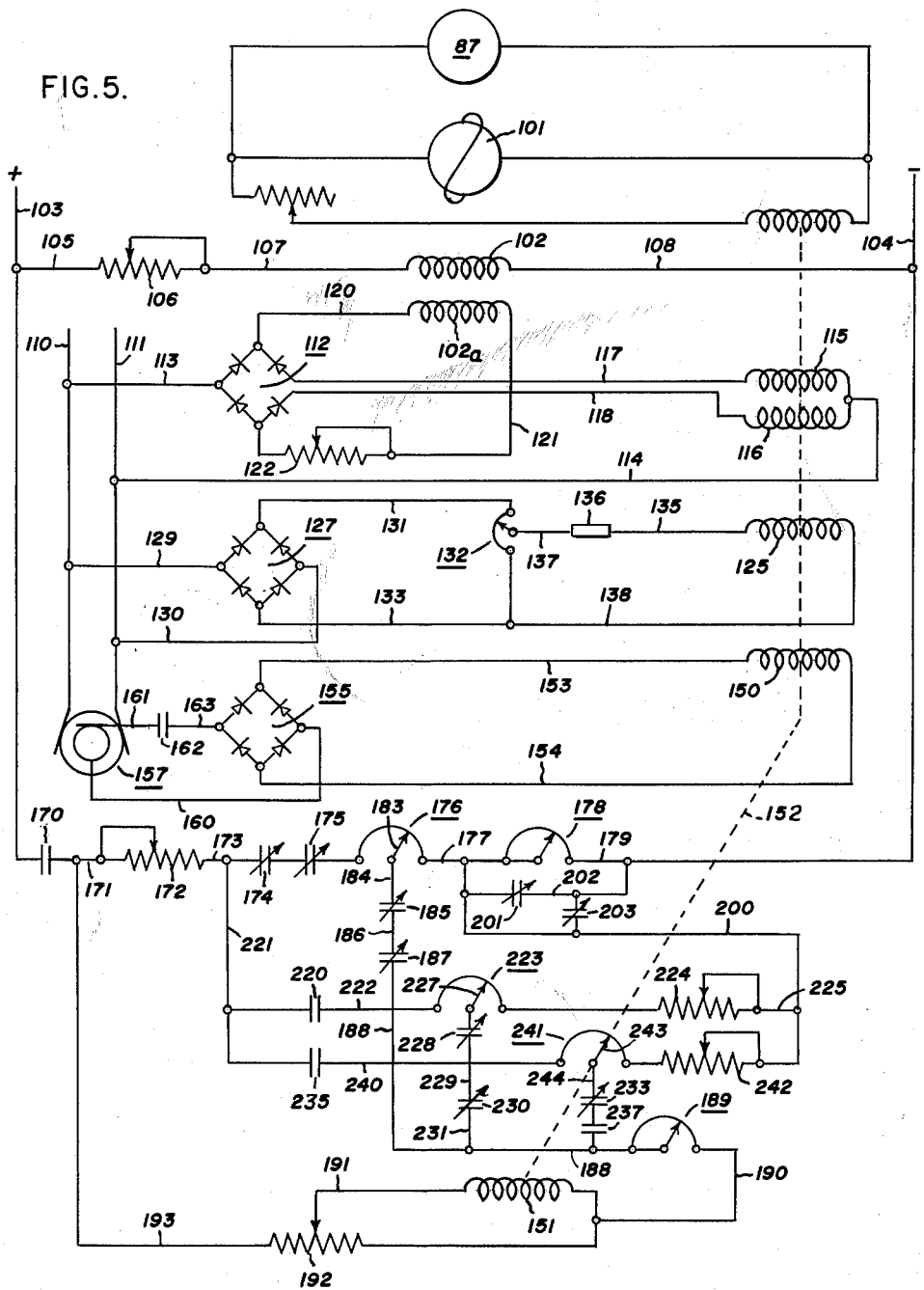
FIGURE 5 is a schematic wiring diagram of the control circuit.

The machine consists of an elongated base 20 on the ends of which are affixed brackets 21 supporting rods 22, FIGURES 1 and 2. A work supporting table 27 is supported by rollers 31 movable along the rods 22. Work piece clamping structures 33 are mounted on the table 27 to receive and clamp the ends of a work piece such as a billet B.

The table 27 is reciprocated in a lengthwise direction by a motor 37 mounted on the base 20, and having a pinion engaging a gear rack 38 secured to the underside of the table. The extent of the movement of the table on the base is controlled by switches 40, 41 mounted on a bracket 42 fixed to the base 20. The switches 40, 41 are actuated by shoes 43, 44 carried by the end clamping structures 33 movable into clamping engagement with the ends of the billet B.

A base structure 50 extends rearwardly from the center portion of the machine, and supports a carriage 51, the carriage being provided with rolls 52 movable along the base 50. The carriage is moved toward and from the table 27, in a direction transversely thereof, by a cylinder structure 53, see FIGURE 3, in which the carriage is shown in its rearward position.

A pair of columns 60 are fixedly secured to the carriage 51 and extend upwardly therefrom. A support 61 is slidably mounted on the column for vertical movement toward and from the carriage. A plate 62 is fixedly secured to the front side of the support 61 and is provided with forwardly extending arms 63 which carry at their outer forward ends bearing blocks to receive a shaft 64, FIGURE 1.

Similar arms 66 are fixedly secured at their inner ends to a plate 67 extending in vertically spaced relation to the fixed plate 62. Bearing blocks 68 are affixed to the arms 66 intermediate the ends thereof to receive the shaft 64. A grinding wheel arbor 69 is journalled in bearings 70 affixed to the outer portions of the arms 66. A grinding wheel 71 is mounted on the arbor 69.

A motor is mounted on a plate 74 secured to the arms 66. The motor 73 is operatively connected to the grinding wheel arbor 69 by belts 75, preferably enclosed by a suitable guard 77, see FIGURE 1.

In the arrangement described, the arms 66, bearing blocks 68, arbor 69, constitute a grinding wheel mount which has pivotal movement about the shaft 64, whereby the grinding wheel mount has vertical movement relative to the support 61.

Clockwise rotation of the wheel mount, FIGURE 1, is limited by bolts 80, extending through the upper portion of the fixed plate 62 and the movable plate 67. Compression springs 81 are mounted on the bolts 80 intermediate the plates, whereby the wheel mount is yieldingly urged downwardly toward the billet B.

Means is provided for moving the support 61 vertically on the columns 60 to move the grinding wheel into and out of engagement with the work piece. The support 61 has attached to it a vertically disposed gear rack 83. A pinion 84 is arranged in mesh with the rack, and is mounted on the output shaft 85 of a gear reducing unit 86. The input shaft of the gear reducing unit 86 is connected to a reversible motor 87 mounted on a bracket 88, fixed to a plate 89 secured to the upper ends of the columns 60. Sheaves 90 are mounted on the plate 89, and cables 91 are fixed at like ends to the support 61, and at their opposite ends to weights 93 contained within the column 60, this arrangement providing a counter balance for the support 61, and the wheel mount.

It will be apparent that, when the motor 87 is operated in such direction as to move the support 61 downwardly, the grinding wheel 71 is moved into engagement with the billet, and upon continued downward movement of the support, the wheel mount will pivot about the shaft 64, and the plate 67 will move rearwardly toward the fixed plate 62, this movement being resisted by the springs 81. Such movement results in increasing the pressure of the grinding wheel 71 on the billet. The amount of material removed from the billet is in proportion to the pressure of the wheel against the billet.

The machine described is shown in greater detail in my copending application, Serial Number 97,562, filed March 22, 1961.

The purpose of grinding billets and slabs is to remove the scale and imperfections in the surface of the piece. If this scale surface, and the imperfections existing are not removed, they cause serious defects when the billet is subsequently heated and rolled. It is very desirable to remove from the billet, or slab, only enough material to remove the scale and defects. This is particularly true in the high price steel alloys, billets and slabs, the price of which in the billet and slab form runs in the neighborhood of .35¢ per pound.

It will be apparent that the pressure of the grinding wheel on the work piece is determined by the position of the support 61. Billets and slabs, especially billets, are often of irregular shape—that is—they are warped, or bowed. If the bow is upward, the pressure between the grinding wheel and the work piece increases as the upwardly bowed surface is engaged by the wheel. If the wheel mount were maintained in a fixed position, this would mean that excess material would be ground from the upwardly bowed portion of the piece.

This invention has to do particularly with a control system which functions to maintain a substantially uniform pressure between the grinding wheel and the work piece by vertically adjusting the support 61.

The motor 87 is supplied with power by a generator 101. This generator is motor driven, and is of the armature reaction, excited type, and is commonly known as an amplidyne, manufactured by the General Electric Company. In the arrangement of this invention, the generator is equipped with a pair of field coils energized by a control circuit whereby the field coils are balanced off, each having the same number of ampere turns when the pressure between the grinding wheel and the work piece is at a predetermined value. With the field coils thus balanced off, the output of the generator is zero, and the support adjusting motor 87 is at rest.

When the one field coil is so excited as to contain ampere turns in excess of the other field coil, the output of the generator is in such direction as to cause the motor 87 to raise the support 61 to reduce the pressure between the grinding wheel and the work piece. When the ampere turns of the field coils are in reverse order, the direction of the output of the generator is reversed causing the motor 87 to move the support 61 downwardly to increase the grinding pressure.

Referring to FIGURE 5, the generator is indicated at 101, and has a field coil 102, and a second field coil 102a. The field coil 102 is connected to a supply having constant voltage indicated by the line 103, 104. The circuit for coil 102 is from wire 103, through wire 105, variable resistance 106, wire 107, field coil 102, wire 108, to the side 104.

Field coil 102a is energized by a magnetic amplifier, power to which is furnished from a regulated alternating current supply 110, 111. One side of a full wave bridge rectifier 112 is connected to the side 110 by wire 113. Wire 111 is connected by wire 114 to like ends of coils 115, 116 of the amplifier, the opposite ends of the coils being connected to the opposed legs of the rectifier through wires 117, 118. Generator field coil 102a is connected to the output of the rectifier through wires 120, 121, including the variable resistance 122.

The output of the amplifier is controlled by an amplifier bias field 125, energized by a second bridge rectifier 127, the output terminals of which are connected to wire 110, through wire 129, and to wire 111, through wire 130. The output of the rectifier includes wire 131, potentiometer 132, wire 133. Bias field 125 is connected to the potentiometer by wire 135, resistor 136, wire 137, the opposite end of the field being connected to the wire 133 through wire 138. The bias field 125 is adjusted by the potentiometer 132 to cause the output of the amplifier to establish in the field coil 102a the same number of ampere turns as in field coil 102, whereby the output of the generator 101 is zero, and the motor 87 remains at rest.

There is provided a signal field 150, and a reference field 151. The coils 115, 116 of the magnetic amplifier, bias field coil 125 of the amplifier and the field coils 150, 151 are all arranged on a common core, as indicated by the dashed line 152. The arrangement is such that bias field 125 is unaffected when the ampere turns in the signal field 150 equal the ampere turns in the reference field 151. An increase in the ampere turns in the signal field 150 over the ampere turns over reference field 151 will affect the bias field 125 to cause the amplifier output to the coil 102a to increase. On the other hand, an increase in the ampere turns of the reference field 151 over those of the signal field 150 will result in a voltage drop in the field 102a.

The signal field 150 is connected by wires 153, 154 to the output of a bridge rectifier 155. The rectifier is supplied with power by a voltage regulating means 157, which may be in the form of a selsyn device fixedly secured to the plate 62 on support 61, see FIGURE 1, and having its movable element connected by an adjustable tie rod 158 to plate 67 of the wheel mount. The device is supplied with power from the wire 110, 111, and the output of the device is connected to one input terminal of the rectifier through wire 160 and to the other input terminal through wire 161, switch contacts 162, wire 163.

As the wheel mount is moved upwardly relative to the support 61 by engagement of the grinding wheel 71 with the work piece, and the plate 67 is moved about the pivot 64 toward the plate 62, the output from the voltage regulator 157 increases. The increase is linear. This means that, as the pressure between the grinding wheel 71 and the work piece increases, the voltage increases proportionately in the signal field 150 to thereby increase the ampere turns therein.

The reference field 151 is energized from the regulated D.C. supply 103, 104. The circuit is from side 103 through contacts 170, wire 171, variable resistance 172, wire 173, switch contacts 174, 175, potentiometer 176, wire 177, variable resistance 178, wire 179 to the side 104. A circuit is extended from the movable contact 183 of potentiometer 176 through wire 184, switch contacts 185, wire 186, contacts 187, wire 188, variable resistor 189, wire 190, reference field 151, wire 191, variable resistor 192, wire 193, to wire 171. The setting of the resistor 172, voltage divider 176 and the resistors 189, 192 determine the current flow in the reference field 151.

The switch contacts 162, 170, are closed when the machine is under automatic control, as herein described. The switch contacts 174 are contained in the switch 392, these contacts being opened by shoe 391, FIGURE 3, actuating the switch when the carriage 51 is moved to forward position with the grinding wheel 71 positioned for engagement with the front corner edge of the billet B.

The switch contacts 175 are contained in the switch 396 and are opened when the switch is actuated by the shoe 413, FIGURE 3, upon movement of the carriage 51 to the rear position in which the grinding wheel 71 is in grinding position with respect to the rear corner edge of the billet. Contacts 174 and 175 are closed during the engagement of the grinding wheel with the flat top surface of the billet between the front and rear edges thereof. The purpose of the switches 392, 396 with contacts 174, 175 is to automatically provide a lighter grinding pressure on the front and rear edges of the billet than exists in grinding the flat top surface of the billet, as will be explained further on.

There is a shunt circuit around the variable resistor 178 including the wire 200, switch contacts 201, wire 202, to wire 179. There is a pair of contacts 203 between the wires 200, 202. The contacts 201 are contained in switch 40, FIGURE 2, and the contacts 203 are contained in switch 41. As previously stated, the switches 40, 41, control the extent of the reciprocating movement of the table 27. These switches being actuated by the shoes 43, 44, carried by the end clamp structures 45, whereby the reciprocation of the table carrying the billet B is proportional to the length of the billet. During grinding of the flat top surface of the billet, the switch contacts 201 are closed, and 203 are open, shunting out the resistance 178. As the table 27 approaches the end of its reciprocating movement, contacts 201 are opened momentarily and, during that period, the resistor 178 is effective to reduce the current in wire 188.

As previously stated, the ampere turns in the reference field 151 determines the pressure value desired, and as long as that pressure is maintained between the grinding wheel and the work piece, the support 61 must be at rest, which means that no power is supplied to the motor 87 by the amplidyne generator 101. This, in turn, requires maintaining equal ampere turns in the fields 102, 102a, and this, again, in turn means the existence of equal ampere turns in the signal and reference fields 150, 151, so that the output from the amplifier exists according to the initial setting of the bias field 125.

The ampere turns in the reference field 151 having been established, in accordance with the description given above in respect to the lower portion of the circuitry shown in FIGURE 4, the voltage regulating device 157 is adjusted to effect the same number of ampere turns in the signal field 150 with the existence of the desired pressure between the grinding wheel 71, and the billet. This adjustment may be made by manipulating the adjustable tie rod 158, FIGURE 1.

If the billet being ground is bowed upwardly, the wheel mount will accordingly be moved upwardly relative to the support 61, causing the voltage regulator 157 to provide additional ampere turns in the signal field 150, in excess of ampere turns in the reference field 151 whereupon the amplifier voltage output will be increased so that the ampere turns in field 102a will be greater than in field 102, resulting in the output of the amplidyne generator 101, increasing in such direction as to cause the motor 87 to move the support 61 upwardly to thereby reduce the pressure between the grinding wheel 71 and the billet, and resulting in movement of the plate 67 forwardly from the plate 62, causing the voltage regulator 157 to reduce the ampere turns in signal field 150 to re-establish the balance between the fields 150 and 151, and the balance between the fields 102, 102a to reduce the output of the generator 101 to zero, and stop further operation of the motor 87 and movement of the support 61.

On the other hand, if the billet is bowed downwardly, with the result that plate 67 moves forwardly from plate 62, regulator 157 will be actuated to reduce the output to the signal field 150, reducing the ampere turns therein to less than exists in field 151, whereupon the amplifier voltage output will be decreased so that the ampere turns in field 102a will be less than in field 102, and the output of the generator 101 will then be in such direction as to cause the motor 87 to move the support 61 downwardly until the desired pressure is re-established between the wheel 71 and the billet.

Branch circuits are provided for energizing the reference field 151 during engagement between the grinding wheel 71 with the front and rear corner edges of the billet of the work piece.

As previously stated, contacts 174 are open when the grinding wheel 71 is in engagement with the front corner edge of the billet. Complemental contacts 220 are then closed. There is then a circuit from wire 173 through wire 221, closed contacts 220, wire 222, voltage divider 223, variable resistance 224, wire 225, closed contacts 201, 203, wire 179 to side 104. The movable contact 227 of divider 223 is connected through closed contacts 228, wire 229, closed contacts 230, wire 231 to wire 188. Adjustment of the voltage divider 223 determines the current to the reference field 151 for the grinding of the front corner edge of the billet.

As previously stated, contacts 174 are contained in switch 392. Also contacts 187, 220, 230 and 233 are contained in switch 392. Contacts 174, 187 and 233 are closed when contacts 220 and 230 are open, and vice-versa. Contacts 175, 185, 228, are associated with switch 396 and are closed when contacts 235, 237, are opened, and vice-versa.

As stated, contacts 174, 175, are closed while the top flat surface of the billet is being ground and accordingly, the predetermined desired grinding pressure is determined by the setting of the potentiometer 176. As later described, when the grinding wheel is in contact with the front corner edge of the billet, contacts 174 are opened, and contacts 220, 230, are closed. Accordingly, the potential furnished to the reference field 151 is determined by the setting of the potentiometer 223 and the variable resistor 224.

After the front corner edge of the billet and the flat top surface thereof has been ground and the carriage 51 moved rearwardly so that the grinding wheel 71 engages the rear corner edge of the billet, contacts 175 and 227 open by the actuation of switch 396 and the complemental contacts 233, 237, close. Inasmuch as the front corner edge of the billet has been ground, contacts 174 and 233 are closed, and contacts 220 are open. Accordingly, a circuit is then established from wire 221 through contacts 235, wire 240, potentiometer 241, variable resistor 242, to wire 200. The movable contact 243 of potentiometer 241 is connected through wire 244, closed contacts 233, closed contacts 237, to wire 188, supplying power through variable resistor 189, wire 190, to the reference field 151.

It will be seen, with this arrangement that the ampere turns in reference field 151 is determined during grinding of the front corner edge of the billet by the setting of the potentiometer 223. In grinding the flat top surface of the billet by the setting of the potentiometer 176, and for grinding the rear corner edge of the billet by the setting of potentiometer 241.

When the grinding wheel 71 is in engagement with the front and rear corner edges of the billet, the grinding wheel contacts a smaller area of the billet, as will be obvious, and that is the reason why the control system effects less pressure of the grinding wheel on these corner edges than on the wide top surface of the billet, such variation in the predetermined pressure being adjusted for these corner edges by the potentiometers 223, 241.

After the table 27 reaches each end of its reciprocating movement the end portion of the billet remains longer in contact with the grinding wheel 71 than with the remaining surface of the billet. Accordingly, if the same pressure were maintained between the grinding wheel and the billet, excess material would be ground off from the end portions of the billet. To avoid this, switch contacts 201, 203 are contained in the table limit switches 40, 41, or in additional switches placed in proximity thereto. These contacts are closed, except when the end portions of the billet are engaged by the grinding wheel.

As previously stated, the switch contacts 201, 203, are contained in the table limit switches 40, 41. These contacts are normally closed—that is, during the grinding of the billet, except for the ends thereof, but are opened while the wheel is in contact with the ends of the billet.

What I claim is:

1. A grinder comprising a table having clamping means for clamping a work piece in fixed position thereon, means operable to effect reciprocation of said table over a path in a direction lengthwise of the work piece, a carriage mounted for horizontal movement toward and from said table in a direction transversely of said path, a vertically disposed column structure on said carriage, a support slidably mounted on said column structure for vertical movement toward and from the plane of said table, a grinding mount carried by said support above said table and including an arbor journalled for rotation and a grinding wheel mounted on said arbor, a motor operatively connected to said arbor for effecting rotation thereof, said mount having limited vertical movement relative to said support, means yieldingly urging said mount downwardly, a reversible motor connected to said support and operable in forward direction to move said support downwardly for engagement of said grinding wheel with a work piece clamped on said table, and said reversible motor being operable in reverse direction to move said support upwardly, said mount assuming a predetermined position relative to said support upon the pressure between said grinding wheel and work piece reaching a predetermined value, control means connected to said mount for actuation thereby upon the pressure between said wheel and work piece exceeding said predetermined value to energize a power circuit for operation of said reversible motor in reverse direction and, upon said pressure falling below said predetermined value, to energize said power circuit for forward operation of said reversible motor.

2. A grinder comprising a table having clamping means for clamping a work piece in fixed position thereon, means operable to effect reciprocation of said table over a path in a direction lengthwise of the table, a carriage mounted for horizontal movement toward and from said table in a direction transversely of said path, a vertically disposed column structure on said carriage, a support slidably mounted on said column structure for vertical movement toward and from the plane of said table, a grinding mount carried by said support above said table and including an arbor journalled for rotation in a grinding wheel mounted on said arbor, a motor operatively connected to said arbor for effecting rotation thereof, said mount having limited vertical movement relative to said support, means yieldingly urging said mount downwardly, a reversible motor connected to said support and operable in forward direction to move said support downwardly for engagement of said grinding wheel with a work piece clamped on said table and said reversible motor being operable in reverse direction to move said support upwardly, said mount assuming a predetermined position relative to said support upon the pressure between said grinding wheel and work piece reaching a predetermined value, control means for operating said reversible motor to maintain a uniform pressure of predetermined value including an amplidyne generator having its output connected to said reversible motor for operating the same, said generator having first and second field coils, said first field coil being energized by a source of constant voltage, said second field coil being energized by the output of a magnetic amplifier, said amplifier including a reference field coil and a signal field coil, increase or decrease in the algebraic sum of the ampere turns in said reference and signal field coils effecting an increase or decrease respectively in the output voltage of said amplifier, said reference field coil being energized by a supply having a constant voltage, voltage regulating means connected to said wheel mount for actuation thereby upon upward or downward movement thereof from said predetermined position, said voltage regulating means being operable with said wheel mount in said predetermined position to supply voltage to said signal field coil to cause said amplifier output to provide the same number of ampere turns in said second field coil as exists in said first field coil, the output of said generator being zero with equal ampere turns in said first and second field coils, the output of said generator being of such direction as to operate said reversible motor in forward direction when the ampere turns in said first field coil exceed the ampere turns in said second field coil, and to operate said reversible motor to reverse direction when ampere turns in said second field coil exceed the ampere turns in said first field coil, said voltage regulating means being operable upon movement of said mount upwardly from said predetermined position to increase the voltage in said signal field coil and upon movement of said mount downwardly from said predetermined position to decrease the voltage in said signal field.

3. The arrangement as defined in claim 2, wherein means is provided to vary the voltage of the supply for said reference field coil.

References Cited in the file of this patent

UNITED STATES PATENTS

| | | |
|---|---|---|
| 2,168,596 | Hall | Aug. 8, 1939 |
| 2,290,611 | Hite | July 21, 1942 |
| 2,396,775 | De Young | Mar. 19, 1946 |